Oct. 21, 1969       W. J. O'BRIEN       3,474,448
PHASE COMPARISON RADIO NAVIGATION SYSTEMS
Filed Aug. 19, 1968                     4 Sheets-Sheet 1
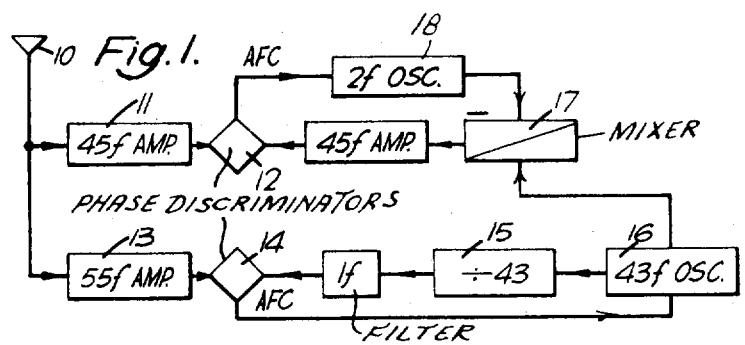
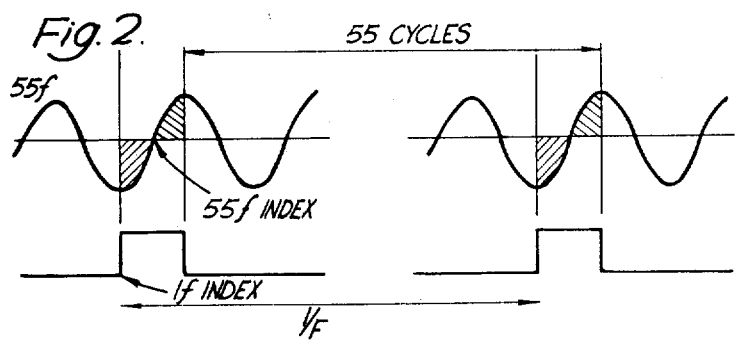

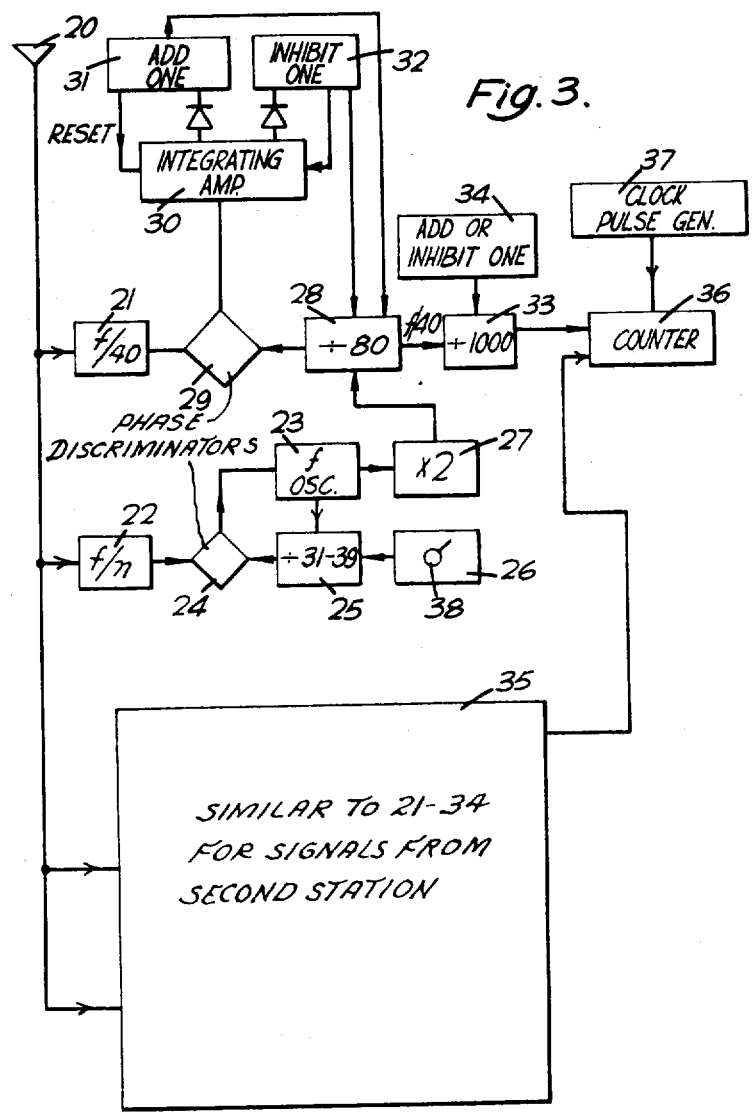

Oct. 21, 1969     W. J. O'BRIEN     3,474,448
PHASE COMPARISON RADIO NAVIGATION SYSTEMS
Filed Aug. 19, 1968     4 Sheets-Sheet 4

United States Patent Office 3,474,448
Patented Oct. 21, 1969

3,474,448
PHASE COMPARISON RADIO NAVIGATION SYSTEMS
William Joseph O'Brien, London, England, assignor to Decca Limited, London, England, a British company
Filed Aug. 19, 1968, Ser. No. 753,575
Claims priority, application Great Britain, Aug. 22, 1967, 38,674/67
Int. Cl. G01s 1/30
U.S. Cl. 343—105                    8 Claims

ABSTRACT OF THE DISCLOSURE

In a receiver for a phase comparison radio navigation system, such as Omega, in which basic frequency signals are radiated from two or more spaced transmitters in sequence to provide a basic pattern of position lines and in which a unique frequency is radiated from each of the transmitters, all of the frequencies being commensurate and having a fixed phase relation and in which the receiver has oscillators locked to the received basic frequency signals, the unique frequency from each station is utilised for rate-aiding the oscillator locked to the basic frequency signal from that station. Advantages is thus taken of the greater availability of the unique frequencies compared with the basic frequency signals from the various stations for controlling the oscillators.

BACKGROUND OF THE INVENTION

Field of the invention

This invention relates to phase comparison radio navigation systems of the kind in which signals, referred to hereinafter as the basic frequency signals, are radiated from two or more spaced transmitting stations in sequence to provide a basic pattern of position lines and in which a unique frequency is radiated from each of the transmitters all the frequencies being commensurate and having a fixed phase relation. By commensurate is meant that all the frequencies are either multiples of a common fundamental freqency or are sub-multiples of a common frequency. To explain these expressions the frequencies $90f$, $100f$ and $110f$ are the ninth, tenth and eleventh harmonics of a common fundamental frequency $10f$. The frequencies $90f$, $99f$ and $110f$ are the eleventh, tenth and ninth sub-harmonics of a common frequency $990f$. In both cases it might be said that there is a common fundamental frequency $1f$ but it will be seen that the first example has simple multiplication factors whilst in the second example, there are simple factors for dividing the common frequency. It is convenient therefore in one case to consider the frequencies as being multiples of a fundamental whereas in the other case it is convenient to refer to them as being sub-multiples of a common frequency.

Description of the prior art

In the phase comparison radio navigation system of the type known as Omega, oscillators are used in the receiver to provide information about the phase of signals radiated intermittently from the transmitting stations. In this system there are a number of stations, for example eight stations, having transmissions which are locked in frequency and phase. The basic frequency signals are radiated from all the stations on a time sharing basis, one signal at a time from each station. In a typical Omega system as at present envisaged, these signals might be at frequencies 10.2 kHz., 11.67 kHz. and 13.6 kHz. These establish hyperbolic patterns of position lines having a lane width (that is to say the distance along the base line between two stations through which a receiver has to move so as to give a measured change of phase of 1 cycle) of one half a wave length at 10.2 kHz. and there are coarser patterns at 3.4 kHz. and 1.13 kHz. In addition further signals referred to as identification signals are radiated from each station at a frequency 10.426 kHz. to provide a coarser pattern of hyperbolic lines with a lane width of half a wave length at 226⅔ Hz. In addition each station radiates a unique frequency for station identification. This frequency is commensurate with other frequencies and is locked in phase therewith. These unique frequencies are referred to as "side frequencies." Each station radiates only one frequency at a time. In an Omega system having eight stations, if all the stations radiate for uniform time periods, any one of the basic frequencies could be radiated from a single station only for ⅛ of a total time at the most and in practice it would have to be about ¹⁄₁₀ or less. The side frequencies however can be radiated all the time a station is not radiating one of the basic frequencies and hence the side frequencies have substantially longer transmission times or duty times than the basic frequencies. It is one of the objects of the present invention to make further use of these side frequency transmissions.

SUMMARY OF THE INVENTION

According to the present invention a receiver for a phase comparison radio navigation system of a kind in which signals, referred to hereinafter as basic frequency signals, are radiated from two or more spaced transmitters in sequence to provide a basic pattern of position lines and in which a unique frequency is radiated from each of the transmitters, all of the frequencies being commensurate and having a fixed phase relation comprises means for selectively receiving the radiated signals, a first phase discriminator to one input of which is applied a first locally generated signal phase locked to a basic frequency signal received from one station, a first frequency controlled oscillator locked to the unique frequency signal from said one station, means for rate-aiding the locally generated signal by means of said frequency controlled oscillator, a second phase discriminator to one input of which is applied a second locally generated signal phase locked to a basic frequency signal received from a second station, a second frequency controlled oscillator locked to the unique frequency signal from said second station, means for rate-aiding the second locally generated signal by means of said second frequency controlled oscillator and means for providing an integrated phase difference of the two locally generated signals. It will be seen that this arrangement each locally generated signal is phase locked to a basic frequency signal received from a different station. The integrating phase indicator thus provides an indication representative of a position line in a pattern formed by the basic frequency transmissions from those two stations. A second position line can be determined in a similar way using another pair of stations, one of which may be common to both pairs, and hence a position fix can be obtained. With the arrangement of the present invention, however, the phase locking of each locally generated signal is rate-aided by means of a frequency controlled oscillator controlled from the unique signals from the appropriate stations. These unique signals are transmitted during the periods when the basic frequency signals are not being transmitted and hence at least partially fill the time periods between the appropriate basic frequency signals from each station. As has been explained above, in the Omega system as at present envisaged, these unique frequency signals are available for much longer time periods than the basic frequency signals. Because these signals are not at the same frequency as the basic signals and cannot in practice be sub-multiples of the effective comparison frequency, there will be ambiguities in any possible determination of the phase relationship between the unique frequency and basic frequency signals. However, the change of phase determined from the unique frequency signals can be used as a rate-aiding correction for the basic signals since the change of phase as determined from the unique frequency signals is correct although there are ambiguities in the absolute phase determination. Instead of carrying the phase of the basic frequency signal forward by means of a stable oscillator in the receiver over the time interval when signals of this frequency are not being received from the appropriate station, it is now carried forward by means of a controlled oscillator with rate-aiding over most of the interval when the basic frequency signals are not received. As will be more fully explained later, this rate-aiding considerably reduces the problems in ensuring correct counting of cycles of phase change in cases where the craft may accelerate or change course in time periods when no basic frequency signals are being received. Moreover, by such rate-aiding, it becomes possible to employ very much narrower bandwidths for the basic frequency receiving channel thereby increasing the signal to noise ratio.

In one construction, at least one of the locally generated signals is derived by heterodyne mixing of the outputs of two frequency controlled oscillators, the first of these oscillators being the aforementioned controlled oscillator phase locked to the unique frequency signal and the other being a further frequency controlled oscillator controlled by the output of a discriminator operating on a basic frequency signal. These two oscillators may, for example, have frequencies the sum of which is equal to the frequency of the basic frequency signal in use. The sum output from the mixer may then be applied to one input of said discriminator to the other input of which is applied the received basic frequency signal and the output of the discriminator may be used to control one of the oscillators (said further oscillator). The other oscillator is controlled from a unique frequency signal. It will be seen that with such an arrangement the extent of phase control provided by the two different oscillators will depend on the ratio of their frequencies; the lower frequency oscillator will provide much less control than the higher frequency oscillator. It is convenient in such an arrangement to make the basic frequency signal control the lower frequency oscillator. The phase discriminator for the basic frequency may thus have a narrow bandwidth input channel without altering acceleration errors, that is to say errors introduced due to a sudden change in the speed or direction of movement of the craft. As will be explained later with reference to a specific example, the bandwidth of the basic frequency signal input might typically be reduced to $\frac{1}{10}$ of what would be required if no rate-aiding control for the oscillator is available. This is equivalent to a 10 to 1 increase in the radiated signal strength at the basic frequency. This is a matter of great importance in radio navigation systems where commonly the extent of coverage of the system is limited by loss of signal in the noise at long ranges.

In the Omega system as at present envisaged, the side frequencies are all sub-harmonics of a common multiple frequency. In such an arrangement it is convenient to have a local oscillator operating at a frequency which is a common multiple of all the transmitted frequencies which oscillator is phase locked to a received unique frequency signal, the output of the oscillator being divided to a frequency equal to or lower than that of the basic frequency to provide a comparison signal for comparing with the received basic frequency signal in a synchronous gate type phase discriminator and the output of the phase discriminator being used to control the time phase of the divider output. For this purpose the discriminator output may be fed to an amplitude and polarity sensitive switching circuit for switching the time phase of the divider output in appropriate steps.

BRIEF DESCRIPTION OF THE DRAWINGS

FIGURE 1 is an explanatory block diagram illustrating part of a receiver for a phase comparison radio navigation system;

FIGURE 2 is a waveform diagram illustrating certain signals in the receiver of FIGURE 1;

FIGURE 3 is a block diagram illustrating part of a receiver for another phase comparison radio navigation system;

DESCRIPTION OF THE PREFERRED EMBODIMENTS

Figure 4:
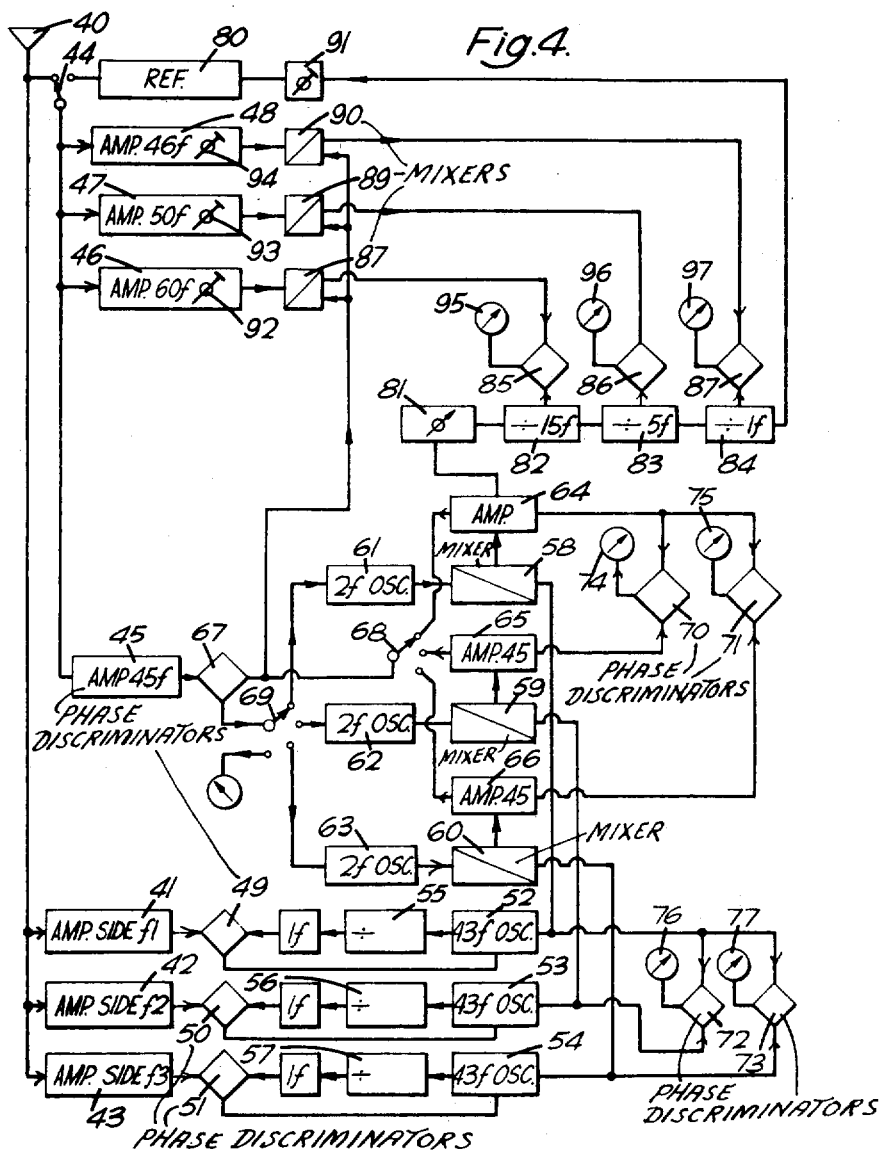
FIGURE 4 is a block diagram of a receiver for a phase comparison radio navigation system.

Referring to FIGURE 1, there is illustrated one arrangement for rate-aiding the phase lock of a locally generated signal to a received basic frequency signal of an Omega type system, the locally generated signal having a substantial phase lock to a received side frequency signal. In FIGURE 1, a receiving antenna 10 feeds the received signals to selective frequency amplifiers for each of the different frequencies. For the purpose of FIGURE 1, it is only necessary to refer to two of the frequencies, namely a basic frequency signal which in this case is at a frequency $45f$ where $f$ is the fundamental frequency, typically $226\frac{2}{3}$ Hz. and one side frequency of $55f$. The $45f$ receiving channel 11 feeds one input of a first phase discriminator 12 whilst the $55f$ receiving channel 13 feeds one input of a second phase discriminator 14. The second input to the discriminator 14, which is of the synchronous detector type, is a short pulse at a frequency $1f$ obtained from a divider 15 by dividing down, by a factor of 43, the output of a $43f$ oscillator 16. The frequency of this oscillator is controlled by the output from the discriminator 14 after amplifying and filtering so that a harmonically related phase lock is maintained between the $43f$ oscillator 16 and the received $55f$ signal. This phase lock has 43 possible settings because the $1f$ divider output may be locked to any cycle of the $43f$ input. Once in operation, however, the divider will remain in a stable lock and thus the phase changes of the oscillator output will correct the phase changes of the $55f$ input signal. There is thus a fixed phase or time relation between the received $55f$ signals and the $43f$ oscillator output.

The output from the $43f$ oscillator 16 is mixed in a heterodyne mixer 17 with a $2f$ signal from an oscillator 18 to provide a $45f$ gating signal which is filtered and amplified by an amplifier 19 to constitute the second input to the discriminator 12. The output of this discriminator 12 is used as a control voltage for controlling the frequency of the $2f$ oscillator 18 and thus the $45f$ gating signal from the mixer 17 is phase locked to the received $45f$ signal.

Under ideal conditions, i.e. the signals being received without noise or interference, the $2f$ oscillator 18 will provide only 2 degrees of phase angle control for each 43 degrees provided by the side frequency control of the $43f$ oscillator 16. Since this control by the $2f$ oscillator 18 is less than $\frac{1}{20}$ of the control provided by the $45f$ discriminator 12, the discriminator input in the receiving channel 11 may now be made of narrower bandwidth, by a factor of at least 10 to 1, over a system in which there is no additional control from the side frequency signal without altering the acceleration errors of the system. These are errors due to changes in the speed or direction of travel of the craft; it will be borne in mind that in a time sharing system where information is obtained periodically, the information data rate has to be sufficiently fast that correct following of phase angle changes without slipping or gaining a cycle is obtained.

Changes in speed or direction of travel require that an oscillator in the craft, to be synchronised with a received signal, must have a slightly different rate due to the Doppler effect. Thus, in a simple system using a locked oscillator periodically brought into synchronism with the received signals, the data sampling rate gives a limit to the acceleration errors which can be tolerated without the possibility of slipping or gaining a cycle. In the system of the present invention, during the major part of the interval when the $45f$ basic signal frequency from one station is not available, the side frequency, in this case $55f$, is available. As described above, this provides correct information about the changes in phase angle and it can thus be used as a rate-aiding signal to give a correction to the $45f$ output from the mixer during the intervals between the reception of the $45f$ basic signal frequency. The ambiguities in the phase of the $43f$ oscillator output signal with respect to the received $55f$ side frequency signal do not affect the use of the oscillator output for rate-aiding the $45f$ signal from the mixer.

It will be seen therefore that the arrangement shown in FIGURE 1 provides a continuous $45f$ signal from the mixer 17 which is unambiguously locked in phase to the received $45f$ signal. It is possible however to use a much narrower bandwidth for the $45f$ receiving channel than would be the case in an arrangement without rate-aiding by a factor of at least 10 to 1 and this is equivalent to a 10 to 1 or more increase in the radiated signal at $45f$.

FIGURE 2 is a waveform diagram to explain the operation of the synchronous detector type phase discriminator 14. Line $a$ in FIGURE 2 shows the waveform of the received $55f$ signals and line $b$ shows the pulses at frequency $1f$ from the divider 15. These pulses have a duration of half a cycle of a frequency $55f$. When the zero crossing point of the $55f$ signal is at the midpoint (in time) of the $1f$ pulse, then the discriminator will give zero output. Any relative time shift of the two signals will result in an output of a polarity and magnitude representative of the sense and amount of the time shift.

The arrangement illustrated in FIGURE 1 may conveniently be used in an Omega type system in which the side frequencies are harmonics of a common fundamental, e.g. they might be a series of harmonics $51f$ to $59f$ in steps of $1f$. Such a receiver will be more fully described with reference to FIGURE 4. However the present adopted side frequency spectrum for Omega is a sub-harmonic series. This series is based on a common multiple frequency $f$ of 408 kHz., the basic signal frequencies being the 40th, 36th and 30th sub-harmonics, i.e. $f/40$, $f/36$ and $f/30$. The side frequencies are the 31st to 39th sub-harmonics. FIGURE 3 is a diagram, similar to FIGURE 1, but showing an arrangement suitable for use with such sub-harmonic frequencies.

In FIGURE 3 there is shown an aerial 20 feeding signals to a first receiving channel 21 tuned to a basic signal frequency $f/40$ and a second receiving channel 22 tuned to one of the side frequencies $f/n$ where $n$ is between 31 and 39. An oscillator 23 at the fundamental frequency $f$ is phase-locked to the side frequency signal from the receiver channel 22 by means of a discriminator 24 gated by the $f/n$ pulses from a divider 25 dividing down the frequency of oscillator 23 by a factor $n$. A reset adjuster 26 is provided having an adjustable control 38 for adjusting the divider to have a division factor appropriate to any selected side frequency. The output of the oscillator 23 at frequency $f$ is multiplied in frequency by a factor of 2 in a multiplier 27 and then divided in frequency by a factor of 80 in a frequency divider 28. The reason for multiplying by a factor of 2 before dividing down is that this reduces the time period of each step in the divider. As is explained later provision is made for automatically adding one step to or subtracting one step from the division factor; the multiplier 27 halves the magnitude of these steps. The output of the divider 28 is a signal of frequency $f/40$ which is used as a gating input to a discriminator 29. The second input to the discriminator is the $f/40$ signal from the receiving channel 21. In a manner similar to that explained with reference to FIGURE 2, the discriminator provides a control signal output of polarity and magnitude representative of the sense and magnitude of the phase difference of the two inputs to the discriminator. This signal is applied to an integrating amplifier 30 having both uninverted and inverted outputs. Each of these outputs, by means of circuits 31 or 32 respectively, gives a trigger signal when the integrated discriminator output exceeds a predetermined level. The trigger signal, according to which circuit 31 or 32 is operative, adds on or inhibits a stage in the divider 28. The trigger signal also resets the integrating amplifier to zero. Thus the circuits 31, 32 advance or retard the output of the divider 28 by a time corresponding to $\frac{1}{80}$ of a cycle. In this way the output of the divider 28 is synchronized in phase with the received $f/40$ signal in steps of $\frac{1}{80}$ of a cycle.

It will be seen that the $f/40$ output of the divider is unambiguously phase-locked to the received $f/40$ signal. The $f/n$ side frequency signal (since $f/n$ is not equal to or a submultiple of $f/40$) cannot by itself provide an unambiguous phase lock for the $f/40$ signal. The $f/n$ signal however can provide information about changes in phase although there are $n$ possible ambiguities in the actual phase determination. This change of phase is used as a rate-aiding signal to control the $f/40$ output from the divider 28. As was explained with reference to FIGURE 1, the rate-aiding signal is available for a much longer duty cycle than the received $f/40$ signal. Thus fuller use is made of the transmitted information, the problem of acceleration errors is reduced and the received channel 21 (for any given acceleration tolerance) can be made of narrower bandwidth thereby improving the signal to noise ratio.

The apparatus shown in FIGURE 3 provides a signal of $f/40$ locked to one station. It can be duplicated as indicated at 35 to provide a signal of $f/40$ locked to a second station. These two signals may then be used to determine a position line. Conveniently this is done by providing timing pips locked to the $f/40$ signal. In the particular arrangement shown in FIGURE 3 such pips are produced by a 1000 to 1 frequency divider 33 which has reset means 34 enabling a unit to be added or inhibited to set the datum. This timing pip may be used for example to start a counter 36 counting clock pulses from a clock pulse generator 37, the counter being stopped by a similar timing pip derived from the signals from a second station by the unit 36; the counter 36 thus measures the time difference of the signals which is representative of a position line. The 1000 to 1 frequency division does not affect the accuracy with which a fraction of a lane is measured as this depends only on the time interval between the timing pips. It enables however the lanes to be counted up to 999.

FIGURES 1 and 3 show arrangements for producing locally generated signals which are each phase locked to a basic frequency signal and with rate-aiding using a received side frequency signal.

In a complete receiver, if good use is to be made of all the information transmitted, a somewhat complex receiver is required. A large number of receiver systems are possible. FIGURE 4 illustrates one arrangement. The receiver of FIGURE 4 is based on principles used in in FIGURE 1 and provides three separate oscillators at $43f$ and three outputs at $45f$ locked to three different stations, this being basically FIGURE 1 in triplicate.

In FIGURE 4, an antenna 40 feeds three receiving channels 41, 42 and 43 tuned to three separate side frequencies. By means of a switch 44, the antenna can feed also the basic signal frequency receiving channels 45, 46, 47 and 48, tuned respectively to $45f$, $60f$, $50f$ and $46f$. Associated respectively with the receiver channels 41, 42 and 43 are phase discriminators 49, 50 and 51 and 43*f* oscillators 52, 53 and 54 with 43 to 1 dividers 55, 56, 57. The phase discriminators 49, 50, 51 control the respective oscillators 52, 53 and 54, as explained with reference to FIGURE 1, and three oscillators provide outputs respectively to three heterodyne mixers 58, 59 and 60. The second inputs to these mixers come from 2*f* oscillators 61, 62 and 63. The mixers produce 45*f* signals which are filtered and amplified by amplifiers 64, 65 and 66. The 45*f* receiver channel 45 is connected to one input of a phase discriminator 67. The other input is cyclically switched to the amplifiers 64, 65 and 66 in accordance with the cyclic switching of the transmissions amongst the stations by means of a solid state switch 68 so that each of the 45*f* amplifiers 64, 65 and 66 provides a signal phase locked to transmissions respectively from three different stations, namely three stations whose side frequencies are employed in channels 41, 42 and 43. The output of the phase discriminator 67 is similarly switched by a switch 69 to the 2*f* oscillators 61, 62 and 63. The apparatus thus far described operates in the manner explained with reference to FIGURE 1.

Position line indications are provided by two phase discriminators 70, 71 with integrating phase meters 74, 75, typically "decometers" such as are used in the Decca Navigator System (Decca is a registered trademark). One phase discriminator 70 is connected between amplifier 64 and amplifier 65 and the other phase discriminator 71 between amplifier 64 and amplifier 66. These phase discriminators and indicators thus operate at a frequency 45*f* and give indications with respect to a hyperbolic pattern based on this frequency. In FIGURE 4 there are also shown two further phase discriminators 72, 73 with integrating phase meters 76, 77, similar to the meters 74, 75 which integrate the phase angle changes between the outputs of the 43*f* oscillators 52 and 53 and 52 and 54 respectively.

Under normal conditions, the 45*f* signals on the phase discriminators 70, 71 will provide a better reading on which to apply corrections. Moreover, as will be explained later, lane identification can be applied to the readings of the meters 74, 75. Under high noise conditions, however, it is to be expected that the 45*f* indication, which has the lower duty time, will fail first. The 43*f* indicators 76, 77 are provided as they may continue to give positional information if the meters 74, 75 have failed due to high noise.

The channels 46, 47 and 48 are to provide lane identification by providing signals to be compared with signals at 15*f*, 5*f* and 1*f* from dividers 82, 83 and 84 which divide down the 45*f* signals from the amplifier 64 by factors of 3, 3 and 5 respectively. The received signals at 60*f*, 50*f* and 46*f* on channels 46, 47 and 48 are mixed with 45*f* signals from the appropriate one of amplifiers 64, 65 and 66 (selected by the setting of switch 68) in mixers 87, 89, 90 to give the inputs at 15*f*, 5*f* and at 1*f* to discriminators 85, 86 and 87 where they are compared with the appropriate frequency signals from the dividers 82, 83 and 84. In order to provide a correct lane identification readout, the relative phase shifts through channels 45, 46, 47 and 48 must be standardized. By means of switch 44, a short duration pip at a frequency 1*f* is applied to the input of these channels from a reference signal source 80, this pip being derived from the 1*f* signals from divider 84. Such a short duration pip provides a set of harmonically related signals at harmonics of 1*f* and in phase. This pip being derived from divider 84 should result in zero phase difference at the discriminators 85 to 87, which discriminators have phase angle indicators 95, 96, 97 to be described later. Any errors are corrected by adjustment of a phase adjuster 91 in the 1*f* input and phase adjusters 92 to 94 in the channels 46 to 48 respectively as follows. The proper or normal phase relation between the 45*f* output from channel 45 and the output from amplifier 64 exists only at zero output from the phase discriminator 67 and is normally maintained by the automatic frequency control previously described for the oscillators 61, 62, 63. During the lane identification period, it is obtained by adjustment of the phase control 91. After proper adjustment of this control, the controls 92 to 94 are adjusted to bring to zero the indications from phase discriminators 82, 83 and 84.

The signal period for standardization may be continuous or may be interrupted. The reference switch 44 may be controlled to provide coupling of the reference generator 80 to the input channels once in each cycle of switching for the various stations. In a system with eight stations, for example, each cycle may include a ninth period in which the reference generator 80 is coupled to the inputs. In this case, the receiver continues to operate normally whilst referencing is being checked. The sequencing switch 68 would have to select the amplifier 64 during this ninth period as well as during the appropriate master period.

The phase indicators 85 to 87 have phase angle indicators 95, 96, 97 respectively. These each constitute a lane indicator in the form of a pointer which moves over a scale having 45 lanes to one revolution. The 1*f* indicator 97 has a single phase and cycle pointer. The 5*f* indicator 96 is geared down 5 to 1 and thus has five stable positions in each revolution. The 15*f* indicator 95 is geared down 15 to 1 and has 15 stable positions in each revolution. The 45*f* indicators 74, 75 are geared down 45 to 1.

The procedure for lane identification is as follows: The channels 46 to 48 are switched to receive only the chosen master station signals. A master phase dispersion correction is applied to the phase shifter 92. This phase correction is dependent largely on the distance to the master station and the ratio of day and night path. The 15*f* divider 82 is then notched, i.e. adjusted in steps, to give on the indicator 95 the nearest reading to zero. The 5*f* divider 83 is then similarly notched. The channels 46 to 48 are now switched to receive one of the slave stations. A reverse dispersion correction is applied to the phase shifter 81 as dictated by the selected slave station. The 5*f* indicator 96 has its lane pointer set to correspond with the 1*f* indicator 97. When the pointer is let free, it will assume the correct one of five stable positions. The 15*f* indicator 95 is set to correspond to the reading of indicator 96 in a similar manner and, when set free, will assume the correct lane count. This reading is then transferred to the appropriate one of the indicators 74 or 75.

The channels 46 to 48 are then switched to receive only signals from a second slave station and the programme repeated to provide the correct lane identification for a second pattern. This particular manner of constructing and calibrating the scales of the indicators facilitates the lane identification procedure since readings can readily be transferred from one indicator to another. For some purposes however it may be preferred to calibrate the indicators in other ways.

The indicators 76, 77 controlled by the side frequencies indicate the phase difference between 43*f* oscillators and thus give a position fix with respect to hyperbolic patterns having a lane width equal to ½ wavelength at a frequency 43*f*. The basic pattern however has a lane width equal to ½ wavelength at 45*f*. The 43*f* indicators 76, 77 can be arranged to give indications with respect to the basic 45*f* pattern by using suitable gearing.

Although the receiver of FIGURE 4 has been described as using harmonically related side frequencies and is based on the principles discussed with reference to FIGURE 1, it may be used for a system in which the side frequencies are sub-harmonics, the side frequency control circuits being arranged as in FIGURE 3. In this case the phase discriminators 70 to 73 and indicators 74 to 77 may be replaced by digital counters, timing pips being used to start and stop the counting.

Figures 5, 6:
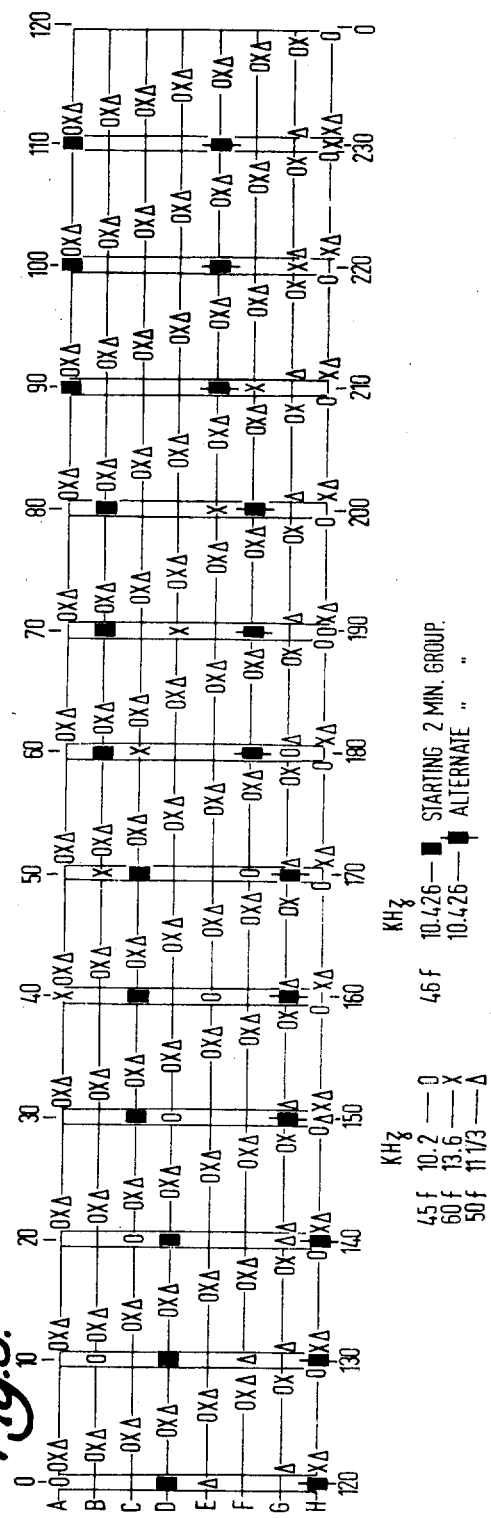
FIGURE 5 is a diagram illustrating an arrangement of the timing of the different signals from different transmitters.
FIGURE 6 is a diagram illustrating the durations of the various transmissions.

FIGURES 5 and 6 illustrate a signal switching sequence for use in the system described with reference to FIGURE 4. A complete cycle of switching of the transmissions occupies 4 minutes with a sub-cycle of 10 seconds. FIGURE 6 shows how the sub-cycle time is divided up and the latters A to H, which indicate the various different stations, show which stations transmit the 45*f* signal during the first sub-cycles of FIGURE 5. It will be noted that, although there are eight stations, the sub-cycle is divided into nine periods, one, marked A–H being used for certain lane identification transmissions. In FIGURE 5 the various lines A to H represent the various stations and the different symbols show the particular transmission frequencies. Each station radiates only one signal at a time. The chart shows only the basic frequency signals and each station, in each period when it is not radiating a basic frequency, radiates its unique side frequency. The diagram of FIGURE 5 has a time scale of 2 minutes. The second 2 minutes of a complete cycle is identical with the first 2 minutes except for the radiation of the 46*f* signal from different stations and, as shown in the key on the drawing, this is indicated in FIGURE 5 by use of a different symbol.

It will thus be seen that during the first sub-cycle, the station A will radiate at 45*f* for one period of ⅝ second, at 60*f* during the next period of ⅝ second and at 50*f* for the next period. For the remainder of this sub-cycle except the lane identification period, the station A will radiate its unique frequency. The station *b* will radiate at 45*f* during the second period of the first sub-cycle and so on. For the lane identification transmissions, the radiation frequencies are shown between the pairs of closely spaced vertical lines in FIGURE 5. Thus during the first sub-cycle, station A is transmitting at 45*f*, station D at 46*f* and station E at 50*f*. Two minutes later, the lane identification transmissions will be station A at 45*f*, station E at 50*f* and station H at 46*f*.

I claim:

1. A receiver for a phase comparison radio navigation system of a kind in which basic frequency signals are radiated from at least two spaced transmitters in sequence to provide a basic pattern of position lines and in which a unique frequency is radiated from each of the transmitters, all of the frequencies being commensurate and having a fixed phase relation, which receiver comprises means for selectively receiving the radiated signals, a first local signal generator, means phase locking said first local signal generator to a basic frequency signal received from one station, a first phase discriminator to one input of which is applied a signal from said first local signal generator, a first frequency controlled oscillator locked to the unique frequency signal from said one station, means for rate-aiding the first locally generated signal by means of said first frequency controlled oscillator, a second local signal generator, means phase locking said second local signal generator to a basic frequency signal received from a second station, a second phase discriminator to one input of which is applied a signal from said second local signal generator, a second frequency controlled oscillator locked to the unique frequency signal from said second station, means for rate-aiding the second locally generated signal by means of said second frequency controlled oscillator and means for providing an integrated phase difference of the two locally generated signals.

2. A receiver as claimed in claim 1 wherein the radiated frequencies are multiples of a common fundamental frequency and wherein there are provided a further frequency controlled oscillator controlled by the output of a discriminator operating on a basic frequency signal and mixing means for deriving at least one of the locally generated signals by heterodyne mixing of the outputs of two frequency controlled oscillators, the first of these being the aforementioned controlled oscillator locked to the unique frequency signal and the other being said further frequency controlled oscillator.

3. A receiver as claimed in claim 2 wherein the two oscillators whose output is mixed have frequencies the sum of which is equal to the frequency of the basic frequency signal in use.

4. A receiver as claimed in claim 3 wherein, of the oscillators whose output is mixed to provide a locally generated signal, the oscillator controlled by the basic frequency discriminator has a lower frequency than the oscillator locked to the unique frequency signal.

5. A receiver as claimed in claim 1 wherein means are provided for determining the integrated phase difference between the outputs from the first and second frequency controlled oscillators.

6. A receiver as claimed in claim 1 wherein the radiated frequencies are sub-multiples of a common frequency, and wherein each of said first and said second frequency controlled oscillators which are phase locked to different received unique frequency signals, operates at a frequency which is a common multiple of all the transmitted frequencies, the output of the oscillator being divided to a frequency equal to or lower than that of the basic frequency signal to provide a comparison signal for comparing with the received basic frequency signal in a synchronous gate type phase discriminator and wherein the output of the phase discriminator is used to control the time phase of the divider output and wherein said means for providing an integrated phase difference of the two locally generated signals comprises a counter counting clock pulses during the time interval between timing pulses obtained from the two divider outputs.

7. A receiver as claimed in claim 6 wherein the divider is of the type in which cycles are counted down and wherein the phase discriminator for controlling the divider output feeds a signal, of polarity and magnitude representative of the sense and magnitude of the phase difference of the two inputs to the discriminator, an integrating amplifier having both uninverted and inverted outputs, which amplifier provides a trigger signal for adding on or inhibiting a stage of the divider according as one or other of the outputs of the amplifier exceeds a predetermined level, the trigger signal resetting the integrating amplifier to zero.

8. A receiver as claimed in claim 6 wherein the output of each frequency controlled oscillator is multiplied in frequency before being divided in frequency.

References Cited

UNITED STATES PATENTS 3,136,995   6/1964   Jolliffe et al. _____ 343—105
3,209,356   9/1965   Smith _____ 343—105
3,202,993   8/1965   O'Brien _____ 343—105

RICHARD A. FARLEY, Primary Examiner

HERBERT C. WAMSLEY, Assistant Examiner